(No Model.)
E. DUPLESSIS.
WEIGHING SCALE FOR RAILWAY CARS.
No. 444,378. Patented Jan. 6, 1891.
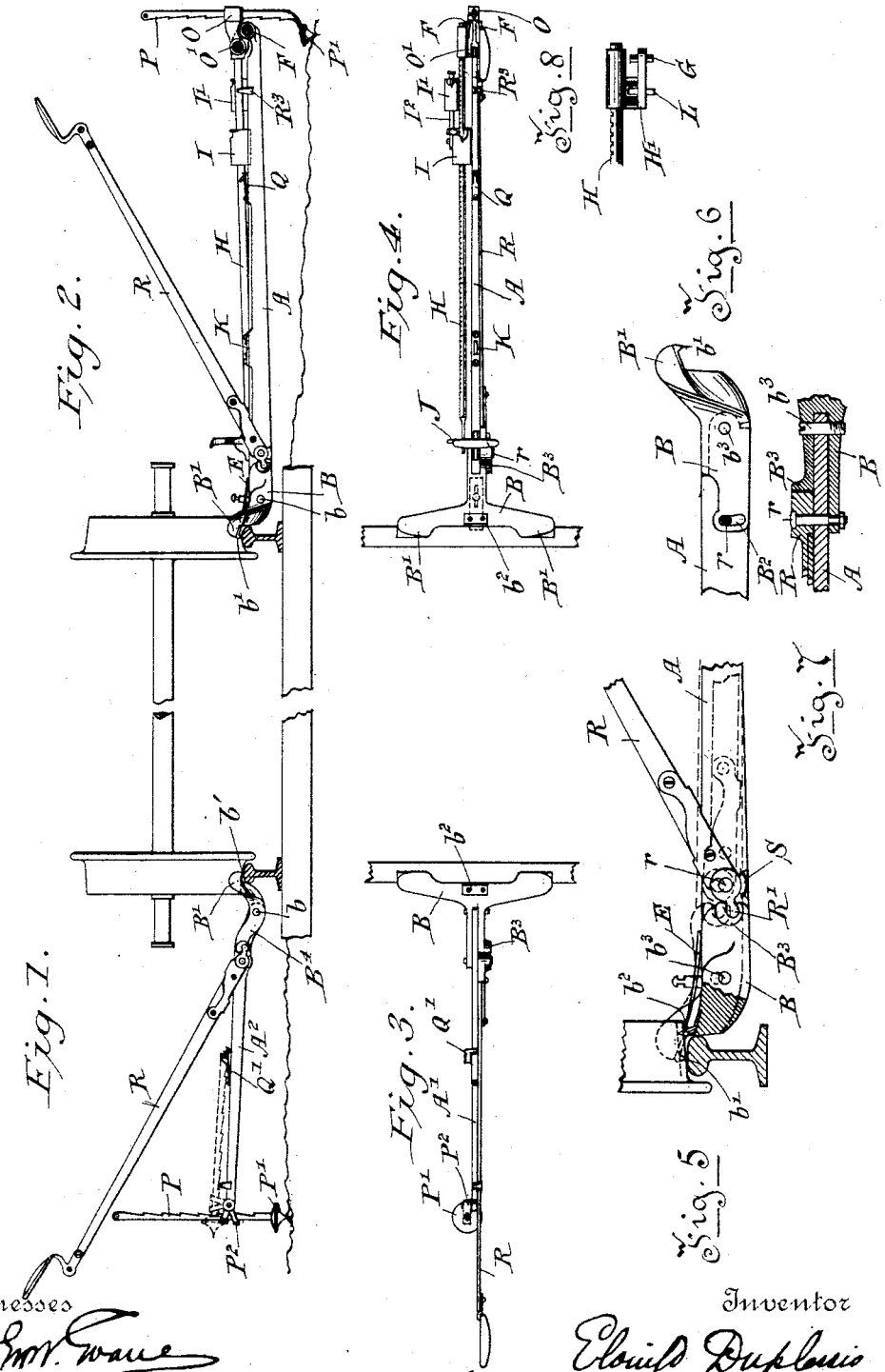

United States Patent Office.

ELOUILD DUPLESSIS, OF ST. HYACINTHE, CANADA, ASSIGNOR OF ONE-HALF TO JEAN-BAPTISTE LALIME AND EMILE A. MARCHILDON, BOTH OF SAME PLACE.

WEIGHING-SCALES FOR RAILWAY-CARS.

SPECIFICATION forming part of Letters Patent No. 444,378, dated January 6, 1891.

Application filed March 6, 1890. Serial No. 342,925. (No model.)

*To all whom it may concern:*

Be it known that I, ELOUILD DUPLESSIS, of St. Hyacinthe, in the county of St. Hyacinthe and Province of Quebec, Canada, have invented certain new and useful Improvements in Weighing-Scales for Railway-Cars; and I do hereby declare that the following is a full, clear, and exact description of the same.

This invention relates to that class of portable scales by which the weight of a car is ascertained by weighing it at its four points of support at different times, and is intended to place the accuracy of measurement beyond doubt and to make the parts easier of adjustment into the proper position previous to taking the weight.

The invention, properly speaking, is an improvement on and addition to the scales shown and described in Letters Patent of the United States of America No. 382,412, granted to me May 8, 1888; and it consists, first, in a supplementary bar with cross-head to be used in connection with that of the scales proper to support the car-wheel opposite that resting on the scale proper, and, secondly, in making the cross-head and bar of the scales proper and the supplementary bar also in two sections pivoted together and adapted to be adjusted by a lever pivoted to such bar to effect the necessary elevation of the wheel from contact with the rail. For full comprehension, however, of the invention reference must be had to the annexed drawings, in which—

Figure 1 is a side view of the supplemental support or bar, and Fig. 2 a like view of the scales proper in position beneath the opposite wheels of an axle of the car not yet raised out of contact with the rails, the operating-levers being elevated. Figs. 3 and 4 are respectively plan views of the same devices with the operating-levers depressed. Fig. 5 is a detail side view, partly in section, of cross-head and part of bar of scales proper and operating-lever in connection with rail and wheel. Figs. 6 and 7 are respectively another (opposite) side view of such cross-head and part of bar and a horizontal section of same; and Fig. 8, a detail plan view of outer end of weighing-beam.

Similar letters of reference indicate like parts.

As regards the scales proper, I may say that, with the exception of making the cross-head separate from the bar, pivoting it to same, and adding the operating-lever, there is no substantial change in its parts or method of working from the scales covered by the said Letters Patent, although the specific construction and immediate relation of such parts have been practically modified.

A is the bar of the scales proper, and B the cross-head pivoted thereto at $b$, the projections B' B' of such cross-head carrying knife-edges $b'$ $b'$ on their under sides and the cross-head also carrying a knife-edge $b^2$ at a central point on its upper surface, as formerly.

E is the wedge-shaped plate, arranged loosely on the cross-head B, to be used when there is any space between the outer edge of the tire and knife-edge $b^2$, which are usually level with the top of the rail.

F are the arms, formed by the outer forked end of the bar A, and provided with bearings for the upwardly-turned knife-edge trunnions G of a right-angled projection or arm H' from the end of the graduated and toothed scale-beam H, which is thus pivoted to bar A.

An equipoise formed of weights I and I' and a small beam $I^2$, extending from I, is adapted to be shifted along the beam H, the movement of the first per notch denominating hundreds of pounds and the latter affording a means of subdivision into fives.

K is the spirit-level, secured on bar A, and J is the combined handle and saddle, whereby the device is conveniently carried, and the movement of the free end of beam H is confined.

L are the downwardly-projecting knife-edge trunnions, in this case also projecting from the right-angled projections H' of beam H, and having their bearings in the forked end O' of the swinging block O. In this block, as formerly, is formed an opening, through which passes the ratcheted support P, with inwardly-projecting foot P'.

Q is a spring holdfast on the top of bar A for retaining the top end of support P when the device is not in use, and such support is placed as shown in Fig. 1. The cross-head B is forked and recessed to fit the end of the bar A, the screw-stud $b^3$ serving to pivot them together, as shown in Figs. 6 and 7.

R is a lever pivoted to the bar A by bolt $r$, passing through both and projecting through a curved slot $B^2$ in the end of the right-hand arm or side piece of the cross-head, as shown in Figs. 6 and 7, and being secured by a nut, the shank of the bolt being flattened to fit such slot, so as to be prevented from turning.

The end of the left-hand side piece or arm $B^3$ of the cross-head is enlarged and presents a bearing or cavity for a projection $R'$ on the pivoted lever R to work in, the hub or part encircling the pivot being thickened to secure strength, and a ledge S, projecting from the side of bar A beneath such hub portion, serving to relieve the pivot of any undue strain.

The supplementary support is shown in Figs. 1 and 3, and embraces only a bar A', similar to bar A, cross-head B', like cross-head B, a support P', not, however, having its end curved inward, and a swinging twin-block $P^2$ for same, a holdfast Q', similar to Q, being carried by bar A'.

When it is desired to weigh the car, the scales proper and the supplementary support are arranged as shown in Figs. 1 and 3, with the knife-edges $b'$ on the rails, the knife-edge $b^2$ in contact with the tire of the wheel, as shown in Fig. 5, and the levers are elevated, so that when these latter are depressed and locked beneath the latches $R^3$ on the bar A the wheels will be raised by the movement of the cross-heads to the position shown by dotted lines in Fig. 5. Previous to depressing the lever of the scales proper the bar of same is by the guidance of the spirit-level brought to substantially a horizontal position, and the lever then being depressed the car is raised and the weight taken. The pivoted cross-head and lever for operating same secure a threefold advantage. In the first place, any necessity for digging a recess in order to lower the scales sufficiently to locate it conveniently in position under the wheel is done away with; secondly, the power required to elevate the wheel by the scales is diminished about seventy-five per cent., and, thirdly, it avoids, as formerly, the tedious trying for a horizontal position in elevating the scales to take the weight, for notwithstanding the arrangement of the spirit-level, which is intended as the guide in this performance, the weight of the car being upon the scales rendered it extremely difficult to adjust same.

As regards the supplemental support, it will be seen that by supporting the car-wheels on knife-edges opposite to each other the entire amount of the proportion being weighed is borne by the scales.

What I claim is as follows:

1. A weighing-scales for railway-cars, comprising a bar provided with a pivoted cross-head at its inner end adapted to be used in connection with one wheel, a supplementary bar also provided with a pivoted cross-head at its inner end to be used in connection with the opposite wheel, supports, and pivoted swinging blocks connected with the outer ends of said bars, a weighing-beam carrying suitable weighing mechanism and pivoted to the outer end of the first-named bar and to one of said swinging blocks, and levers for adjusting said cross-heads to raise the car and secure a true balance, all as set forth.

2. In a weighing-scales, the combination, with a bar, of a cross-head pivoted to its inner end, means for supporting its outer end, and means for adjusting said cross-head vertically, as and for the purpose set forth.

3. In a weighing-scales, the combination, with a bar, of a cross-head pivoted to its inner end, a weighing-beam pivoted to the outer end of said bar, a support for the outer end of such bar, a swinging block or sleeve carrying such support and pivoted to said weighing-beam, and means for adjusting said cross-head vertically, substantially as and for the purpose set forth.

4. In a weighing-scales, the combination, with a bar having a cross-head pivoted to its inner end and carrying a knife-edge, and a lever pivoted to such bar for adjusting said cross-head, of a wedge-plate held loosely in place on same and adapted to be inserted between said knife-edge and the tire of a wheel to be elevated from contact with the rail, substantially as set forth.

5. In a weighing-scales, the combination of a bar and support for outer end of same, a cross-head pivoted to the inner end of said bar, and a lever pivoted to such bar and operating said cross-head, substantially as and for the purpose set forth.

ELOUILD DUPLESSIS.

Witnesses:
OWEN EVANS,
WM. P. MCFEAT.